Sept. 6, 1955     J. S. COCKRELL     2,716,772
MOTOR VEHICLE WHEEL WASHING ATTACHMENT
Filed July 26, 1954     3 Sheets-Sheet 1
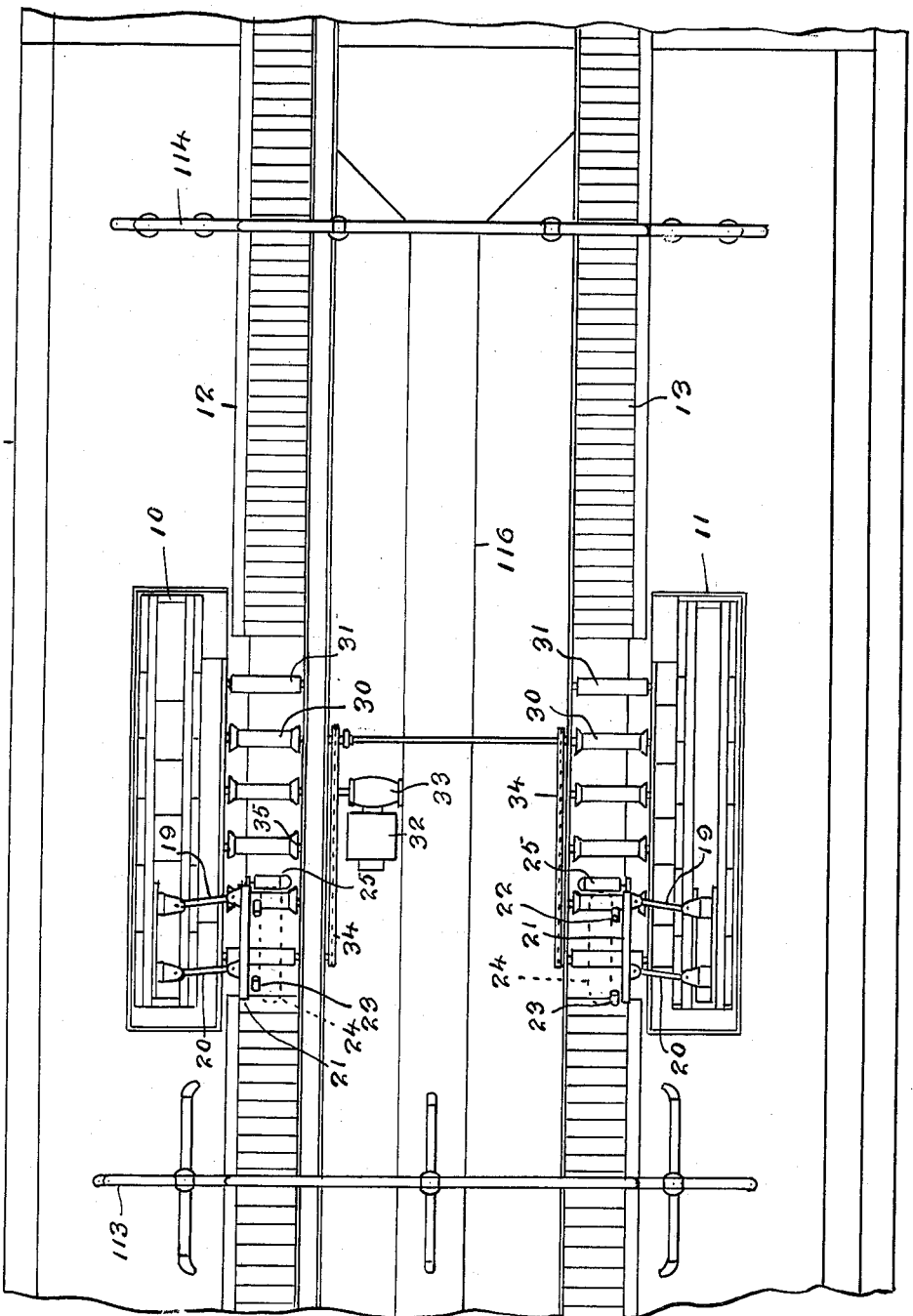
INVENTOR.
Jesse S. Cockrell
BY Victor J. Evans & Co.
ATTORNEYS

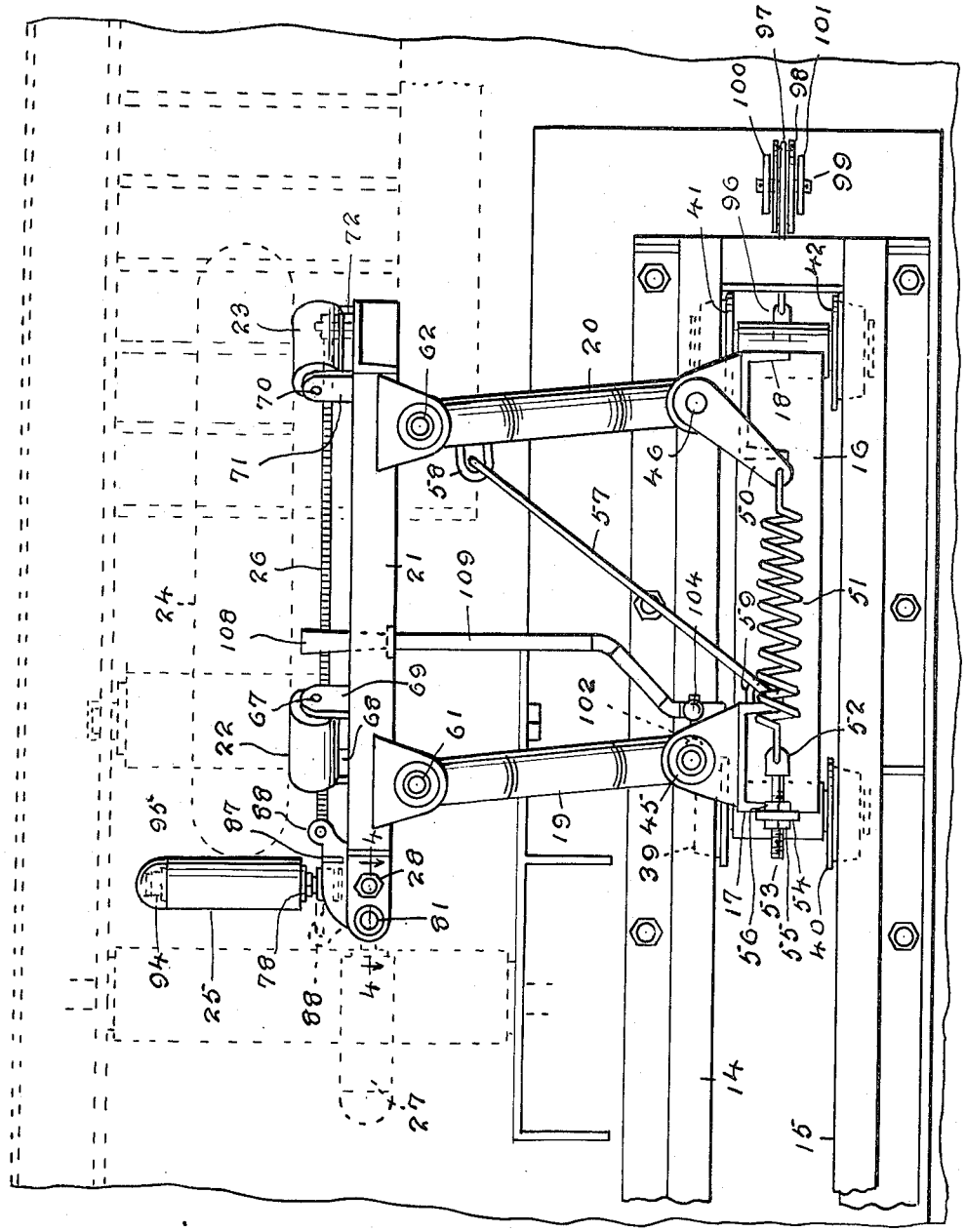

Sept. 6, 1955  J. S. COCKRELL  2,716,772
MOTOR VEHICLE WHEEL WASHING ATTACHMENT
Filed July 26, 1954  3 Sheets-Sheet 3
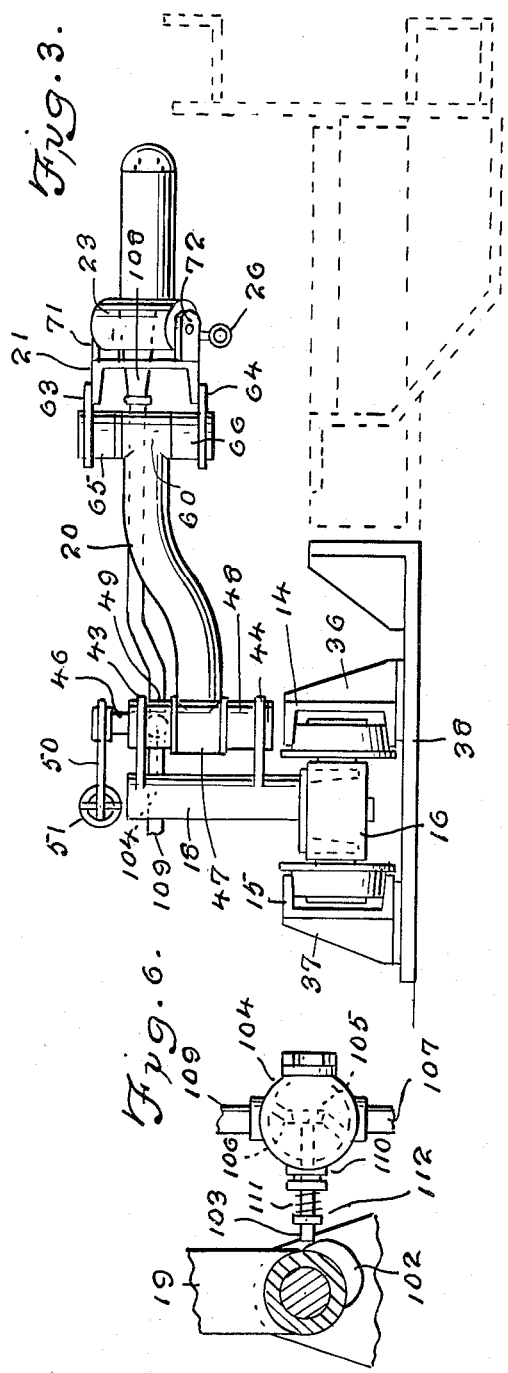
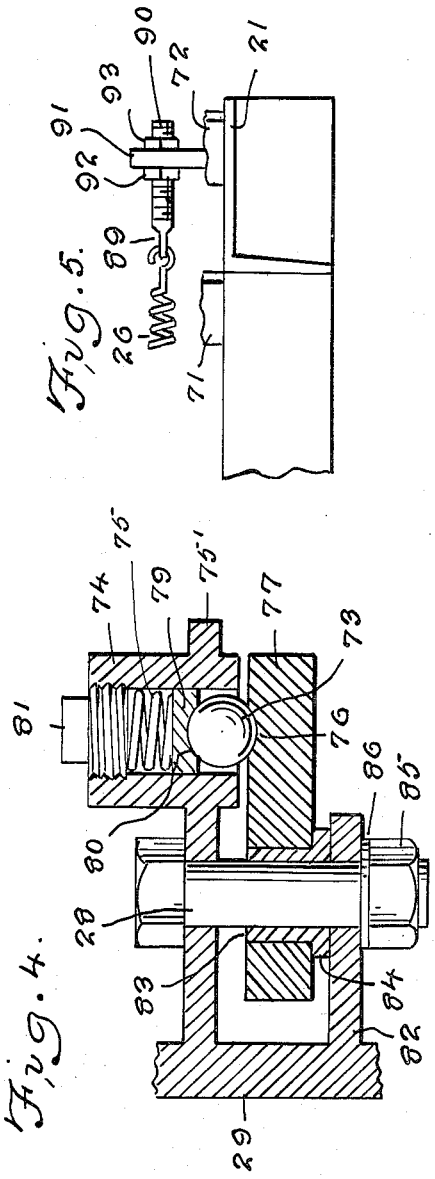
INVENTOR.
Jesse S. Cockrell
BY Victor J. Evans & Co.
ATTORNEYS

United States Patent Office 2,716,772
Patented Sept. 6, 1955

2,716,772

MOTOR VEHICLE WHEEL WASHING ATTACHMENT

Jesse S. Cockrell, Norfolk, Va.

Application July 26, 1954, Serial No. 445,529

3 Claims. (Cl. 15—306)

This invention relates to mechanical devices for washing and cleaning motor vehicles, and in particular, traveling carriages mounted in tracks positioned at the sides of rollers positioned to receive wheels of a vehicle and having rollers positioned in the paths of wheels to be washed whereby upon engagement of the rollers with wheels of the vehicle the washing equipment is carried forwardly with the wheels until engagement of the traveling devices with ends of tracks causes the wheels of the vehicle to overcome tension of springs holding the rollers whereby the rollers are actuated to permit the wheels to pass with the traveling carriages returned by gravity.

This application is a continuation-in-part of my prior application for an Auto Laundry, filed December 15, 1953, with the Serial No. 398,261, in that means is provided for causing wheel-washing sprays to follow wheels of a vehicle with the wheels being sprayed continuously by steam or the like as they pass through a section of the laundry.

The purpose of this invention is to provide wheel-washing and cleaning elements for a motor vehicle laundry in which wheels are thoroughly cleaned by spraying cleaning materials, such as steam, upon the wheels continuously as the wheels pass through a section of the laundry.

It has been found that because of the close proximity of the wheels of a vehicle to the highway over which a vehicle travels, portions of the wheels of a vehicle are soon covered with a thin film and, in numerous instances, grease and tar are incorporated in the film. For this reason, it is difficult to clean wheels of a motor vehicle by spraying water, even with pellets in combination therewith against the surfaces of the wheels.

With this thought in mind, this invention contemplates the use of traveling carriages upon which spraying devices are mounted and means whereby the carriages travel with the wheels through a section of a motor vehicle laundry whereby the wheels are sprayed continuously throughout the length of the section and substantially all foreign matter is removed therefrom.

The object of this invention is, therefore, to provide means for mounting and operating traveling carriages whereby cleaning materials, such as steam, may be sprayed against side surfaces of wheels of a vehicle continuously as the wheels travel through a portion of a motor vehicle laundry.

Another object of the invention is to provide means for actuating a traveling spray device for spraying cleaning materials against side surfaces of wheels of a motor vehicle as the wheels travel through a predetermined distance in which the spraying devices are automatically picked up by the wheels and are also automatically released after traveling predetermined distances.

Another important object of the invention is to provide means for actuating traveling spray devices for spraying cleaning materials upon wheels of a motor vehicle as the wheels travel through an area of a mechanical laundry in which the traveling devices are actuated by engagement of parts thereof with the wheels to be cleaned thereby so that the cleaning devices are in registry with the wheels.

A further object of the invention is to provide a wheel-cleaning attachment for a mechanical motor vehicle laundry whereby the wheels are washed continuously as they travel through a certain section of the laundry in which the wheel-cleaning attachment is of a comparatively simple and economical construction.

With these and other objects and advantages in view, the invention embodies a motor vehicle laundry having wheel-receiving tracks with wheel-rotating rollers positioned in gaps in the tracks and with wheel-spraying devices carried by traveling carriages positioned to travel in rails extended from sides of the tracks and in which the traveling carriages are moved forwardly by wheels being cleaned by spray devices thereof and are returned by counter-weights connected to the carriages with cables.

Other features and advantages of the invention will appear from the following description taken in connection with the drawings, wherein:

Figure 1 is a plan view showing a section of a mechanical motor vehicle laundry, the section including a plurality of spaced motor-driven rollers for rotating wheels of a vehicle traveling on the tracks and showing traveling carriages mounted in rails at the sides of the tracks with the carriages including rollers positioned to be engaged by wheels traveling on the tracks.

Figure 2 is a plan view similar to that shown in Figure 1 illustrating a traveling carriage at one side of one of the tracks, the parts being shown on an enlarged scale and the parts being broken away.

Figure 3 is a cross section through a track on one side of the laundry illustrating the mounting of the traveling carriages and showing wheel-engaging rollers suspended from a carriage.

Figure 4 is a detail showing a section taken on line 4—4 of Figure 2, with the parts shown on a still further enlarged scale illustrating the friction-mounting means of a roller positioned to be engaged by a wheel of a vehicle whereby a wheel, as shown in dotted lines, engaging a roller carries a traveling carriage forwardly until the carriage engages end surfaces of rails in which the carriage is mounted.

Figure 5 is a detail illustrating a mounting of a spring which coacts with the friction-holding means of the roller shown in Figure 2 for resiliently retaining the roller in an extended position until a traveling carriage upon which the device is mounted engages the end of a track formed by the rails in which the rollers of the carriage are positioned.

Figure 6 is a detail illustrating a cam-actuated valve which opens a steam supply connection to a spray nozzle of the attachment as the device travels forwardly.

Referring now to the drawings wherein like reference characters denote corresponding parts, the improved wheel-washing and cleaning attachment of this invention includes auxiliary tracks 10 and 11 positioned on the outside of vehicle tracks 12 and 13, respectively, of the motor vehicle laundry with each of the auxiliary tracks including channel-shaped rails 14 and 15 and with each of the tracks provided with a carriage 16 on which vertically disposed channel-shaped posts 17 and 18 are mounted. The device also includes swinging arms 19 and 20 carried by the posts and which provide supporting means for a channel 21 which carries rollers 22 and 23 that are positioned to engage the sides of a wheel or tire, as indicated by the dotted lines 24 and the channel 21 includes a roller 25 which is pivotally mounted on the leading end thereof and which is resiliently held in engagement with the wheel by a spring 26 until the carriage 16 engages an obstruction, such as the end of the track, at which time tension of the spring 26 is overcome and the wheel 24 moves the roller 25 from the position shown in full lines in Figure 2 to the position indicated by the dotted lines 27, the roller 25 being pivotally mounted by a bolt 28 in a bracket 29.

Each of the tracks 12 and 13 is provided with a plurality of rollers, such as the rollers 30 and 31, and, as shown in Figure 1, the rollers are rotated by a motor 32 through a gear reduction 33 and a chain 34, the chain being trained over sprockets on shafts 35 extended from the rollers. The rollers 30 and 31 are positioned in gaps in the tracks 12 and 13 and the auxiliary tracks 10 and 11 are positioned to correspond with the rollers.

The auxiliary tracks include rails formed with channels 14 and 15 and the channels are supported by brackets 36 and 37, respectively, which are mounted on a base plate 38.

The carriage 16 is provided with rollers 39 and 40 at one end and 41 and 42 at the opposite end and, as illustrated in Figure 3, the rollers being positioned to travel in the channel-shaped rails 14 and 15 with the posts 17 and 18 extended upwardly. Each of the posts is provided with an upper arm 43 and a lower arm 44 and the swinging arms 19 and 20 are mounted on vertically disposed shafts 45 and 46 that are rotatably mounted in the arms 43 and 44. The swinging arms 19 and 20 are provided with hubs 47 and the hubs are positioned between spacing elements 48 and 49. The upper end of the shaft 46 is provided with an additional arm 50 to the end of which a spring 51 is connected and the opposite end of the spring is held in an eye 52 of a bolt 53 which extends through a lug 54 extended from the post 17 and the bolt is retained in adjusted position by nuts 55 and 56.

Movements of the swinging arms 19 and 20 are controlled by a rod 57, a hook on one end of which is retained in an eye 58 extended from the swinging arm 20 and a hook on the opposite end is retained in an eye 59 on the post 17.

The oposite ends of the arms 19 and 20 are also provided with hubs, as indicated by the numeral 60, and the hubs 60 are pivotally mounted by pins 61 and 62 in plates 63 and 64 extended from upper and lower flanges of the channels 21, the hubs 60 being spaced from the plates with spacing elements 65 and 66.

The roller 22 is rotatably mounted by a shaft 67 in bearings 68 and 69 on the back of the channel 21 and the roller 23 is similarly mounted with a shaft 70 in bearings 71 and 72. The rollers 22 and 23 are positioned to contact side surfaces of wheels with the wheels positioned as indicated by the dotted lines 24 in Figure 2.

The roller 25 is carried by the bracket 29 which is secured to one end of the channel 21 and, as illustrated in detail in Figure 4, the roller is retained in an outwardly extended position by a spring-actuated ball 73 in a cylinder 74 of an upper arm 75 of the bracket 29 with a spring 75 which urges the ball into indentations 76 in the upper surface of a plate 77 on which a shaft 78 on which the roller 25 is rotatably mounted is secured. A disc 79 with a recess 80 therein is slidably mounted in the cylinder 74 and positioned with the upper surface of the ball 73 in the recess 80 and the disc is urged against the ball with the spring 75, the tension of which is controlled by a nut 81. The nut is threaded in the upper end of the cylinder 74 and by this means the tension of the spring 75 may be adjusted to hold the roller 25 in an extended position until the carriage strikes an obstruction in the track or arrives at the end of the track formed by the rails 14 and 15.

The plate 77 is pivotally mounted in the arms 75 and 82 of the bracket 29 with the bolt 28 and, as shown in Figure 4, the plate is provided with a bushing 83 having a flange 84 on the lower end and the lower end of the bolt is provided with a nut 85, under which is a washer 86.

The plate 77 is provided with a lug 87 and an eye 88 in which one end of the spring 26 is connected and, as illustrated in Figure 5, the opposite end of the spring 26 is connected to an eye 89 of a threaded stud 90, the stud 90 being adjustably held in a bracket 91 extended from the channel 21, with adjusting nuts 92 and 93. By this means the tension of the spring 26 is adapted to be adjusted so that the spring will return the roller 25 to the position shown in Figure 2 after a wheel of a vehicle passes through the washing section or stage of the laundry.

The roller 25 is secured on the shaft 78 with a nut 94 positioned in a cap 95 on the extended end of the roller.

Upon being released from a wheel, the roller 25 returns to the position shown in Figure 2 and the carriage is returned to the starting position at the end of the track formed by the rails 14 and 15 by a conventional counter-weight which is connected to an eye 96 on the end of the carriage 16 by a cable 97, the cable being trained over a pulley 98 which is rotatably mounted by a shaft 99 in a pulley block or bracket having side plates 100 and 101. It will be understood that the traveling carriage may be returned by other suitable means.

With a traveling carriage positioned on each side of the path through which a vehicle travels and with the auxiliary tracks 10 and 11 at the sides of the vehicle tracks 12 and 13, respectively, a roller 25 is provided for each wheel whereby a carriage on each side of the vehicle travels with the wheels and, as the carriages start to follow the wheels of the vehicle, cams 102 positioned on the shafts 45 of the swinging arms 19 engage valve stems 103 of steam valves 104 whereby valve members 105 are moved from seats 106, as illustrated in Figure 6, and steam is admitted from supply pipes 107 to nozzles 108 through pipes 109.

The valve stems 103 extend through packing glands 110 and the valves are resiliently urged to closed positions by springs 111 positioned between the packing glands and set collars 112 on the stems. By this means the valves are opened and steam is ejected over surfaces of wheels continuously as the carriages are carried forwardly by the wheels of the vehicle, and as soon as the carriages return to the positions shown in Figures 1 and 2, the valves are closed and the steam supply shut off thereby.

This attachment is adapted to be incorporated in the track of the motor vehicle laundry of my copending application with the Serial No. 398,261, as noted before, and with the device positioned in the section in which the rotating rollers are mounted the wheels of the vehicle will rotate and the outer surfaces will be thoroughly cleaned in the section or stage of the laundry between the spray devices 113 and 114. As illustrated in Figure 1, the laundry housing is indicated by the numeral 115. Condensation and other fluids such as washing and rinsing water sprays drain back into a sump for recirculation through a trough 116.

It will be understood that modifications, within the scope of the appended claims, may be made in the design and arrangement of the parts without departing from the spirit of the invention.

What is claimed is:

1. In a motor vehicle wheel-cleaning attachment for a mechanical motor vehicle laundry, the combination which comprises spaced parallel tracks positioned to receive wheels of a motor vehicle, auxiliary tracks spaced from outer sides of the former tracks, carriages mounted for longitudinal travel in the auxiliary tracks, swinging arms pivotally mounted on said carriages, rollers positioned to contact side surfaces of wheels on the tracks carried by said swinging arms, rollers pivotally mounted at the ends of the swinging arms and positioned to extend in the paths of wheels of a vehicle traveling on said tracks, resilient means for retaining the pivotally mounted rollers in extended positions, means for releasing the pivotally mounted rollers as carriages upon which the rollers are mounted reach predetermined positions, means for returning the pivotally mounted rollers to positions in paths of wheels traveling on said tracks, and means for returning the carriages to starting positions.

2. In a motor vehicle wheel-cleaning attachment for a mechanical motor vehicle laundry, the combination which comprises spaced parallel tracks positioned to receive wheels of a motor vehicle, auxiliary tracks spaced from outer sides of the former tracks, carriages mounted for longitudinal travel in the auxiliary tracks, swinging arms pivotally mounted on said carriages, rollers positioned to contact side surfaces of wheels on the tracks carried by said swinging arms, rollers pivotally mounted at the ends of the swinging arms and positioned to extend in the paths of wheels of a vehicle traveling on said tracks, resilient means for retaining the pivotally mounted rollers in extended positions, means for releasing the pivotally mounted rollers as carriages upon which the rollers are mounted reach predetermined positions, means for returning the pivotally mounted rollers to positions in paths of wheels traveling on said tracks, means for returning the carriages to starting positions, and means for spraying steam upon surfaces of wheels engaged by the rollers carried by the swinging arms.

3. In a motor vehicle wheel-cleaning attachment for a mechanical motor vehicle laundry, the combination which comprises spaced parallel tracks positioned to receive wheels of a motor vehicle, auxiliary tracks spaced from outer sides of the former tracks, carriages mounted for longitudinal travel in the auxiliary tracks, swinging arms pivotally mounted on said carriages, rollers positioned to contact side surfaces of wheels on the tracks carried by said swinging arms, rollers pivotally mounted at the ends of the swinging arms and positioned to extend in the paths of wheels of a vehicle traveling on said tracks, resilient means for retaining the pivotally mounted rollers in extended positions, means for releasing the pivotally mounted rollers as carriages upon which the rollers are mounted reach predetermined positions, means for returning the pivotally mounted rollers to positions in paths of wheels traveling on said tracks, means for returning the carriages to starting positions, means for spraying steam upon surfaces of wheels engaged by the rollers carried by the swinging arms, and means for opening the steam supply upon starting the traveling movements of said carriages, said means also shutting off the steam supply upon return of the carriages to starting positions.

References Cited in the file of this patent

UNITED STATES PATENTS

| | | |
|---|---|---|
| 1,682,902 | Gibson | Sept. 4, 1928 |
| 2,692,214 | Hurst | Oct. 19, 1954 |